United States Patent [19]

Kobayashi et al.

[11] Patent Number: 5,381,091

[45] Date of Patent: Jan. 10, 1995

[54] SENSOR HAVING MUTUALLY PERPENDICULAR SECTIONS USING ZIGZAG COILS FOR DETECTING DISPLACEMENT

[75] Inventors: Takanori Kobayashi; Yoshifumi Nagano; Kiyohito Yamasawa, all of Nagano, Japan

[73] Assignee: Techno Excel Kabushiki Kaisha, Nagano, Japan

[21] Appl. No.: 998,664

[22] Filed: Dec. 30, 1992

[30] Foreign Application Priority Data

Jan. 14, 1992 [JP] Japan .................. 4-24490

[51] Int. Cl.$^6$ .................. G01B 7/14; G01P 3/50; G01L 9/10; H01F 21/04
[52] U.S. Cl. .................. 324/207.17; 73/745; 324/207.24; 324/162; 324/173; 336/129; 340/870.32
[58] Field of Search .............. 324/160, 162, 163, 166, 324/173, 207.16, 207.18, 207.22, 207.23, 207.24; 307/118; 336/115, 123, 129, 45; 318/659, 660; 340/870.31, 870.32, 870.35, 870.36; 73/313, 314, 722, 753, 745

[56] References Cited

U.S. PATENT DOCUMENTS

| | | | |
|---|---|---|---|
| 3,090,934 | 5/1963 | Farrand | 336/129 |
| 3,202,948 | 8/1965 | Farrand | 336/115 |
| 3,473,098 | 10/1969 | Waller | 318/660 |
| 4,604,575 | 8/1986 | Shimizu et al. | 324/162 X |
| 4,879,672 | 11/1989 | Pombrio, Jr. | 324/162 X |
| 5,046,702 | 9/1991 | Miyazawa et al. | |

FOREIGN PATENT DOCUMENTS 0010558 1/1980 Japan .................. 324/207.17

OTHER PUBLICATIONS

"Inductosyn Precision linear and rotary position transducers" Farrand Controls Brochure and Catalogue May 28, 1987.
Kiyohito Yamasawa et al., Ieee Transactions on Magnetics, vol. 26, No. 3, May 1990.

*Primary Examiner*—Gerard R. Strecker

[57] ABSTRACT

A sensor having a wide sensing range is capable of being controll by a small scale processor. The sensor comprises: a plurality of planar zigzag coils being provided on substrates, the planar zigzag coils having the same coil pitch and being formed into zigzag shape in a first direction, the planar zigzag coils being capable of relative movement in the first direction, the planar zigzag coils including a first planar zigzag coil, which is a primary coil, and a second planar zigzag coil, which is a secondary coil; a magnetizing unit for magnetizing the first planar zigzag coil; a first detecting unit for detecting induced electromotive force, which is induced in the second planar zigzag coil by the first magnetized planar zigzag coil; and a second detecting unit for detecting displacement length between the first planar zigzag coil and the second planar zigzag coil on the basis of the induced electromotive force in the second planar zigzag coil. Therefore, the sensor is capable of having a wide sensing range in which the first planar zigzag coil induces the second planar zigzag coil.

2 Claims, 8 Drawing Sheets

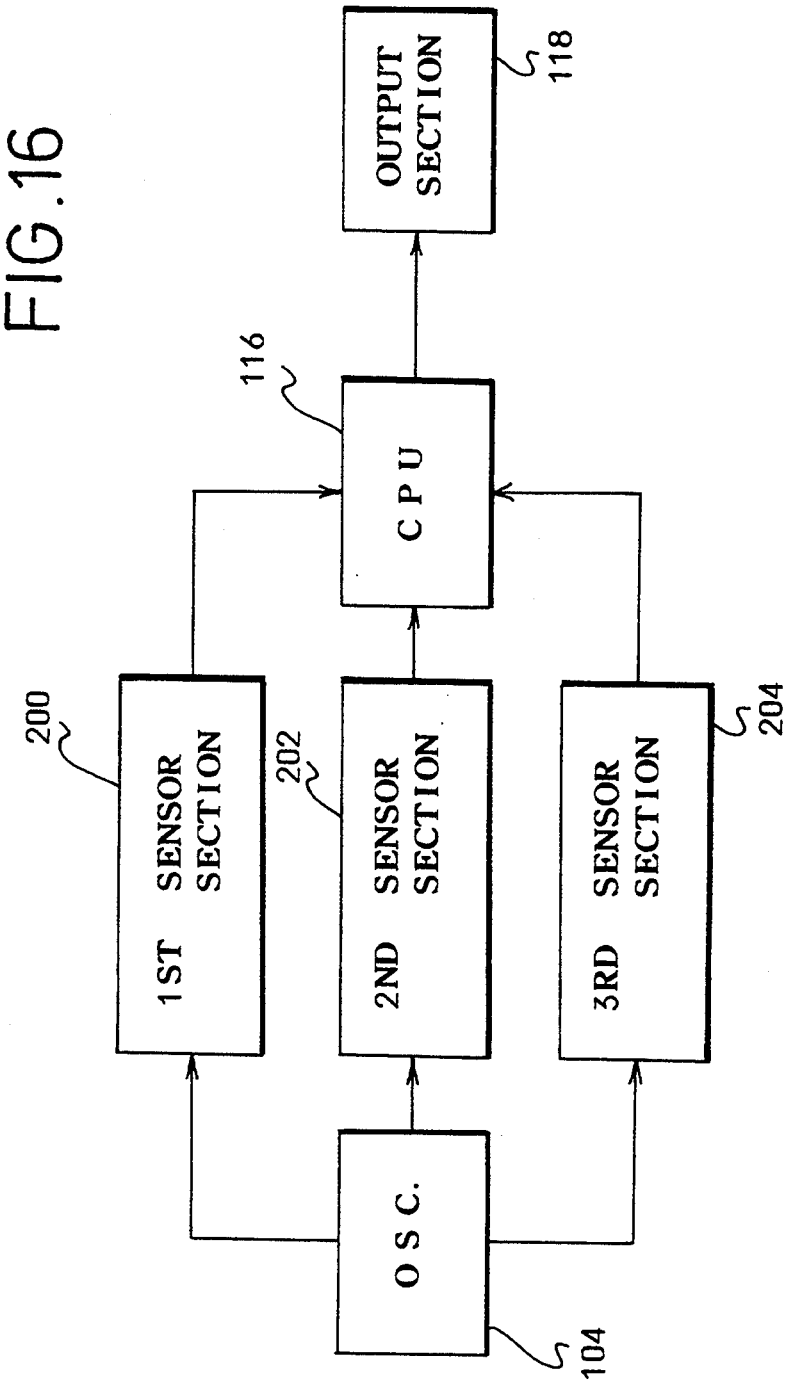

SENSOR HAVING MUTUALLY PERPENDICULAR SECTIONS USING ZIGZAG COILS FOR DETECTING DISPLACEMENT

BACKGROUND OF THE INVENTION

The present invention relates to a sensor, and more precisely relates to a sensor, which is capable of detecting displacement length on the basis of mutual displacement length of coils.

Many types of sensors have been known. The applicant of the present invention also invented a displacement sensor. The displacement sensor was disclosed in U.S. Pat. No. 5,046,702. The displacement sensor has a coil, a diaphragm and a magnetizable body, which is fixed to the diaphragm and is capable of moving close to and away from the coil. When the magnetizable body moves close to and away from the coil with the movement of the diaphragm, reactance of the coil changes, so that displacement length of the diaphragm can be known by detecting the change of reactance thereof.

However, the conventional sensor has the following disadvantages.

Firstly, while the magnetizable body moves to the coil from outside, the reactance of the coil changes suddenly; on the other hand, while the magnetizable body goes into the coil, the reactance thereof changes gradually. Therefore, a practical sensing range, in which the displacement length of the magnetizable body can be practically detected, is limited to a range until the magnetizable body reached the coil. In other words, the displacement sensor has a small sensing range.

Secondly, a processor, which is capable of processing large amount of data, is required so as to convert the change of the reactance to the displacement length of the diaphragm because the reactance changes curvedly.

SUMMARY OF THE INVENTION

An object of the present invention is to provide a sensor having a wide sensing range, and which is capable of being controll by a small scale processor.

The sensor of the present invention basically comprises:

a plurality of planar zigzag coils being provided on substrates, the planar zigzag coils having the same coil pitch and being formed into zigzag shape in a first direction, the planar zigzag coils being capable of relatively moving in the first direction, the planar zigzag coils including a first planar zigzag coil, which is a primary coil, and a second planar zigzag coil, which is a secondary coil;

magnetizing means for magnetizing the first planar zigzag coil;

first detecting means for detecting induced electromotive force, which is induced in the second planar zigzag coil by the magnetized first planar zigzag coil; and second detecting means for detecting displacement length between the first planar zigzag coil and the second planar zigzag coil on the basis of the induced electromotive force in the second planar zigzag coil.

The second detecting means may detect the displacement length on the basis of number of detections of a predetermined value of the induced electromotive force, which is detected by the first detecting means.

In the present invention, the second detecting means detects the displacement length between the first planar zigzag coil and the second planar zigzag coil on the basis of the induced electromotive force. Therefore, the sensor is capable of having a wide sensing range in which the first planar zigzag coil is able to induce a current in the second planar zigzag coil.

Especially, when the second detecting means detects the displacement length on the basis of a number of detections of the predetermined value of the induced electromotive force, the displacement length can be determined by dealing with a small amount of data.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

Embodiments of the present invention will now be described by way of examples and with reference to the accompanying drawings which are given by way of illustration only, and thus are not limitative of the present invention, and, in which:

FIG. 16 is a block diagram of a Sixth Embodiment.

DETAILED DESCRIPTION OF PREFERRED EMBODIMENTS

Preferred embodiments of the present invention will now be described in detail with reference to the accompanying drawings.

(First Embodiment)

Figure 1:
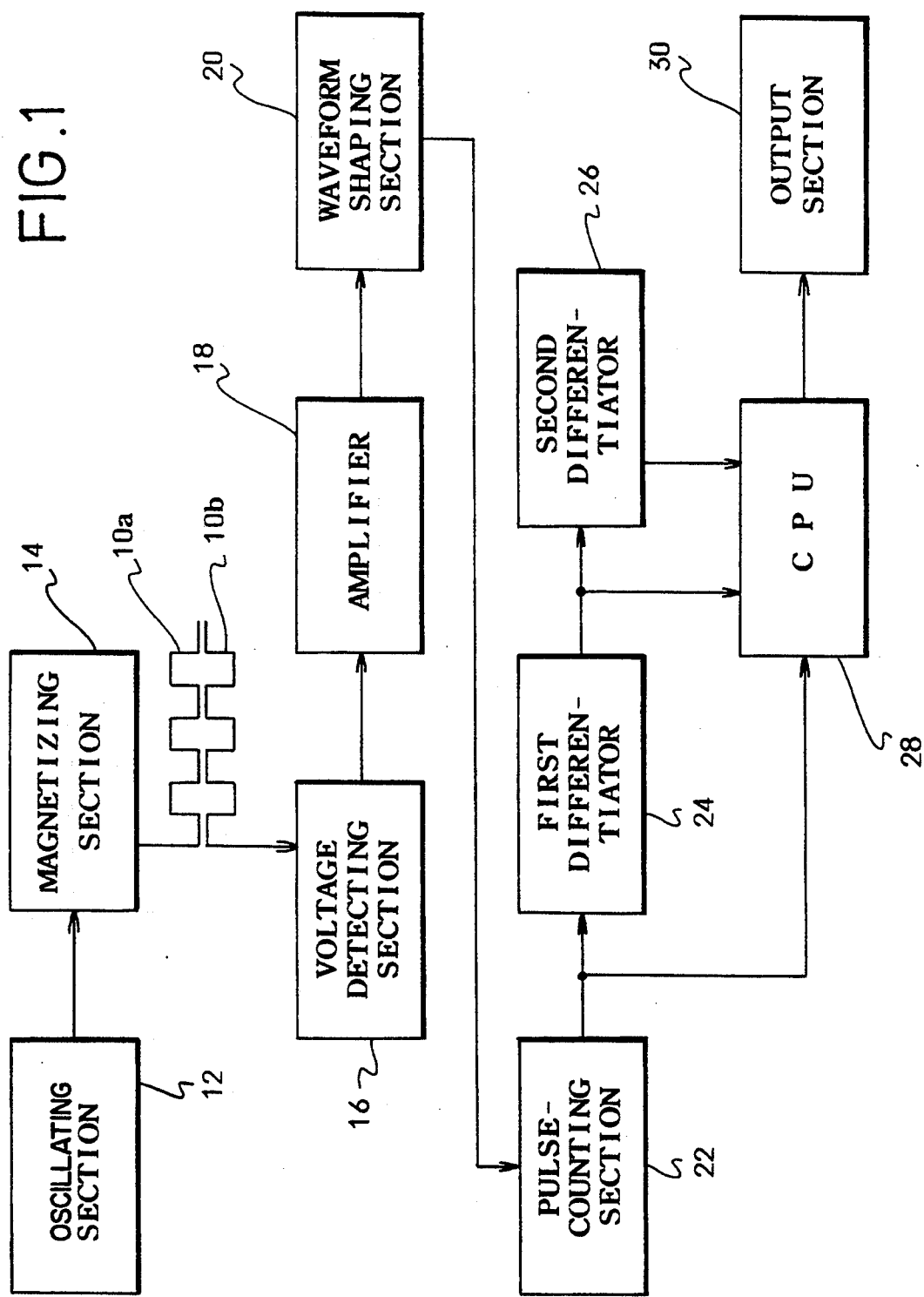
FIG. 1 is a block diagram of a sensor of a First Embodiment.

The First Embodiment will be explained with reference to FIG. 1.

Figure 2:
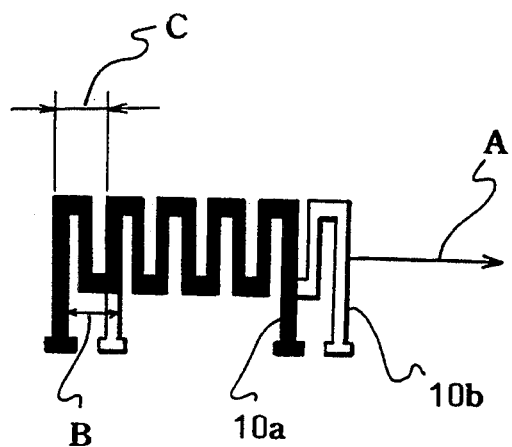
FIG. 2 is a front view of planar zigzag coils.
Figure 3:
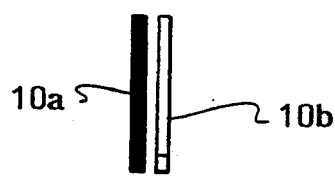
FIG. 3 is a side view of the planar zigzag coils shown in FIG. 2.

Planar zigzag coils 10a and 10b are provided in parallel (see FIGS. 2 and 3). The planar zigzag coils 10a and 10b are respectively formed on each inner face of substrates, which are provided in parallel, to face each other. Coil pitch and the direction in which the planar zigzag coils 10a and 10b extend are the same. The planar zigzag coils 10a and 10b are formed on the substrates by, for example, evaporation. Position of the planar zigzag coil 10a is fixed; the planar zigzag coil 10b is capable of moving in a first direction (a pitch direction) A (see FIG. 2). Therefore, a multilayered microtransformer is formed by the planar zigzag coils 10a and 10b. In the present embodiment, the width (the length in the first direction A) of the planar zigzag coil 10a is equal to that of the planar zigzag coil 10b. Note that, the width of both of the planar zigzag coils 10a and 10b need not be the same.

An oscillating section 12 includes a high frequency oscillating circuit. High frequency waves from the oscillating section 12 are amplified to a prescribed voltage level by a magnetizing section 14, which includes an amplifying circuit, and inputted to the planar zigzag coil 10a. The oscillating section 12 and the magnetizing section 14 compose magnetizing means for magnetizing the planar zigzag coil 10a, which is a first planar zigzag coil or a primary coil.

A voltage detecting section 16, which is an example of first detecting means, is capable of detecting induced voltage (induced electromotive force), which is induced in the planar zigzag coil 10b, which is a second planar zigzag coil or a secondary coil, by the planar zigzag coil 10a magnetized by the magnetizing section 14.

An amplifier 18 amplifies the induced voltage, which is detected by the voltage detecting section 16, to a prescribed voltage level.

A waveform shaping section 20 converts analogue signals, which are amplified by the amplifier 18, to digital pulse signals.

A pulse-counting section 22 includes a counter circuit. The pulse-counting section 22 counts the number of the digital pulse signals from the waveform shaping section 22. Displacement length of the planar zigzag coil 10b with respect to the planar zigzag coil 10a can be detected on the basis of the number of the pulse signals.

A first differentiator 24, which is an example of third detecting means, detects moving speed of the planar zigzag coil 10b with respect to the planar zigzag coil 10a on the basis of the displacement length of the planar zigzag coil 10b.

A second differentiator 26, which is an example of fourth detecting means, detects acceleration of the planar zigzag coil 10b with respect to the planar zigzag coil 10a on the basis of the moving speed of the planar zigzag coil 10b.

A CPU 28, which is an example of second detecting means, includes a microprocessor and memory units. The CPU 28 calculates the displacement length of the planar zigzag coil 10b with respect to the planar zigzag coil 10a on the basis of the pulse number counted by the pulse-counting section 22. The CPU 28 also calculates the moving speed of the planar zigzag coil 10b with respect to the planar zigzag coil 10a on the basis of the displacement length detected by the first differentiator 24. Furthermore, the CPU 28 calculates the acceleration of the planar zigzag coil 10b with respect to the planar zigzag coil 10a on the basis of the moving speed detected by the second differentiator 26.

An output section 30, which is an example of output means, is, for example, a display unit. The output section 30 selectively shows items of the displacement length, the moving speed, the acceleration, etc., which are calculated by the CPU 28. The items shown are selected by input means (not shown), e.g. a keyboard.

Successively, action of the sensor will be explained with reference to FIGS. 2-4.

Figure 4:
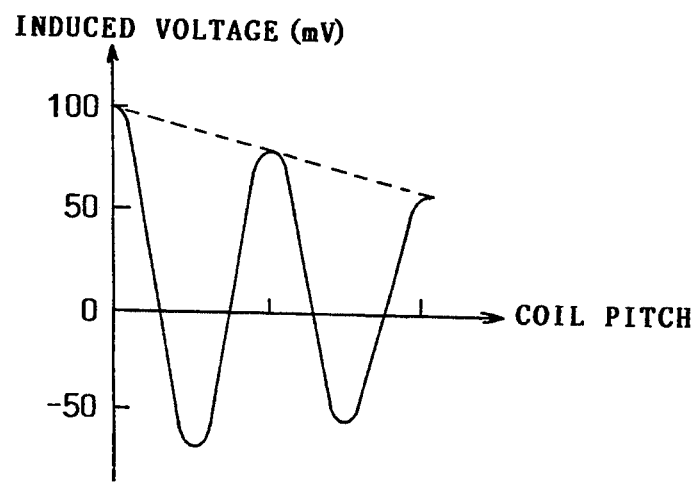
FIG. 4 is a graph of induced voltage of a second planar zigzag coil.

When the second planar zigzag coil 10b (colored in white) is moved with respect to the first planar zigzag coil 10a (colored in black), which is being magnetized by the magnetizing section 14, in the first direction A, the induced voltage of the planar zigzag coil 10b versus the displacement length B thereof, which is indicated as coil pitch, is shown by a solid line in a graph of FIG. 4.

To detect the length B, the number of detections of a pre-determined value of the induced voltage, e.g. 0 (mV), of the planar zigzag coil 10b is counted. In the present embodiment, as clearly shown in FIG. 4, the induced voltage of the planar zigzag coil 10b becomes 0 (mV) with every $\frac{3}{8}$ pitch (1 pitch=C). Namely, in cases that the displacement length B of the planar zigzag coil 10b is $\frac{3}{8}$ pitch, 6/8 pitch, 11/8 pitch, . . . , the induced voltage is 0 (mV). Therefore, the length B can be known as a digital value by counting the number of detections when the induced voltage is 0 (mV). In the present embodiment, the induced voltage, which are analogue signals, detected by the voltage detecting section 16 is amplified, and converted to digital pulse signals by the waveform shaping section 20. The pulse-counting section 22 counts the pulse number N. The CPU 28 calculates the displacement length B by multiplying said $\frac{3}{8}$ pitch by the pulse number N. Namely, it is shown as $B = N \cdot \frac{3}{8} \cdot C$.

To detect the moving speed of the planar zigzag coil 10b, the pule number N is differentiated by the first differentiator 24. The CPU 28 multiples said $\frac{3}{8}$ pitch by the differentiated value.

To detect the acceleration of the planar zigzag coil 10b, the calculated moving speed is differentiated by the second differentiator 26. The CPU 28 multiples said $\frac{3}{8}$ pitch by the differentiated value from the second differentiator 26.

In case that the first planar zigzag coil 10a is arranged and fixed alongside a stroke track of a displacement body (not shown) and the second planar zigzag coil 10b is attached to the displacement body, the induced voltage of the planar zigzag coil 10b changes with the movement of the displacement body, so that the displacement length of the displacement body with respect to the planar zigzag coil 10a can be known.

Note that, in the above description, the first planar zigzag coil 10a is fixed; the second planar zigzag coil 10b is movable. But the first planar zigzag coil 10a may be movable; the second planar zigzag coil 10b may be fixed. Furthermore, both coils 10a and 10b may be movable.

Successively, shapes of the planar zigzag coil will be explained with reference to FIGS. 5-7. Note that, the shapes, of course, can be employed in the following embodiments.

Figure 5:
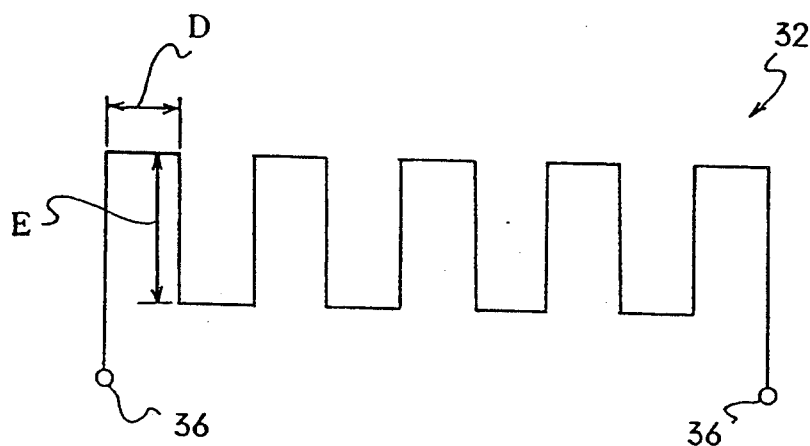
FIG. 5 is an explanation view showing a planar zigzag coil.

In FIG. 5, a planar zigzag coil 32 has the same shape as described above for the planar zigzag coils 10a and 10b. The number of turns is one; the number of meanders is five. Note that, if the length E is greater than the length D, the sensivity of the sensor can be increased.

Figure 6:
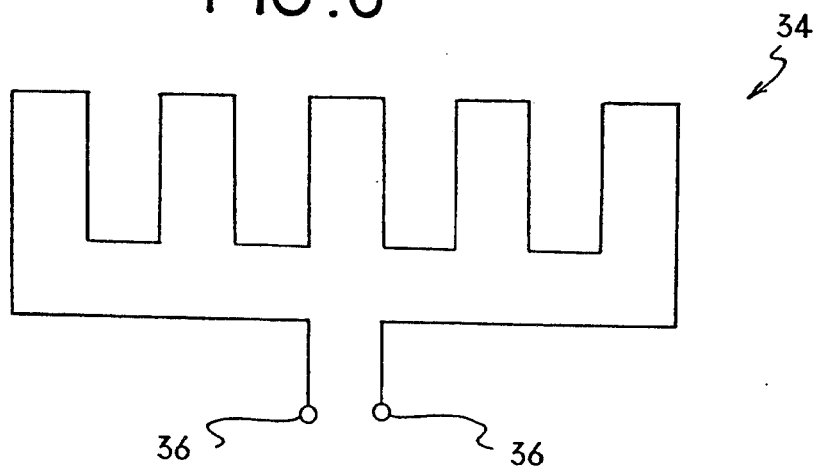
FIG. 6 is an explanation view showing a planar zigzag coil.

In a planar zigzag coil 34 of FIG. 6, the number of turns is one; the number of meanders is five. Positions of terminals 36 are different from the ones shown in FIG. 5.

Figure 7:
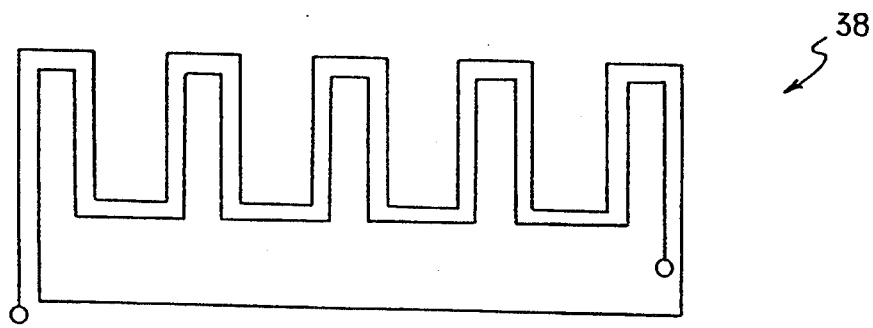
FIG. 7 is an explanation view showing a planar zigzag coil.

In a planar zigzag coil 38 of FIG. 7, the number of turns is two; the number of meanders is five.

Note that, the ratio of transformation of the multilayered microtransformer can be changed by changing the number of turns of the planar zigzag coils.

The sensing accuracy of the displacement length can be increased by making the coil pitch C (see FIG. 2) smaller. Fine pitch planar zigzag coils can be made by, for example, the thin film technology.

The width, in the first direction, of the planar zigzag coils may be defined, for example, according to desired range of sensing the displacement length. The range is defined according to inducible range of the first planar zigzag coil, in which the first planar zigzag coil influences the second planar zigzag coil. The most important point of the sensor is the electromagnetic induction between the first planar zigzag coil and the second planar zigzag coil, so both coils need not be arranged in parallel.

The shape of meanders of the planar zigzag coils is not limited to a right angle. For example, curvy meanders may be employed in the planar zigzag coils. Even if the planar zigzag coil has curvy meanders, the length E is preferably greater than the length D so as to increase the sensivity (see FIG. 5).

The first direction (the pitch direction) need not be a straight direction, so, for example, it may be a curved direction. In the case of the curved direction, a sensor, which is capable of detecting the displacement length or the displacement angle of rotation, can be realized.

Figure 8:
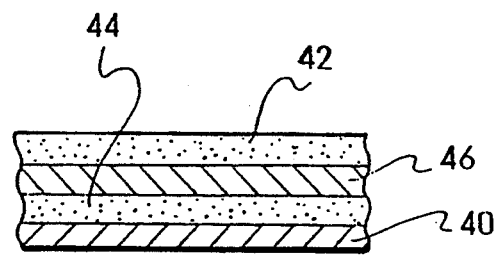
FIG. 8 is a partial sectional view of a planar zigzag coil.

Next, the structure of the planar zigzag coil will be explained with reference to FIG. 8. The structure of the coil is, of course, employed in the following embodiments.

A base 40 is a part of the substrate, and made of a magnetizable material, e.g. permalloy. By using the magnetizable material for the base 40, a magnetic circuit of the rear side (shown as the lower side in FIG. 8) is closed. If outer sides of the planar zigzag coils, which are mutually faced, are made of a magnetizable material, not only magnetic circuits are closed but also the magnetizable material shields noise from outside.

Insulating layers 42 and 44 are also parts of the substrate, and made of a insulating material, e.g. silicon dioxide.

A coil layer 46, which is a planar zigzag coil proper, is sandwiched between the insulating layers 42 and 44. The coil layer 46 is made of an electric conductive material, e.g. copper. The plan shape of the coil layer 46 is a zigzag shape (see FIG. 2).

Note that, a surface of the base 40 on which the planar zigzag coil is formed may not only be a flat face but also may be a curved face.

Since the planar zigzag coils are two dimensional, mass production and cost reduction can be realized.

(Second Embodiment)

Figure 9:
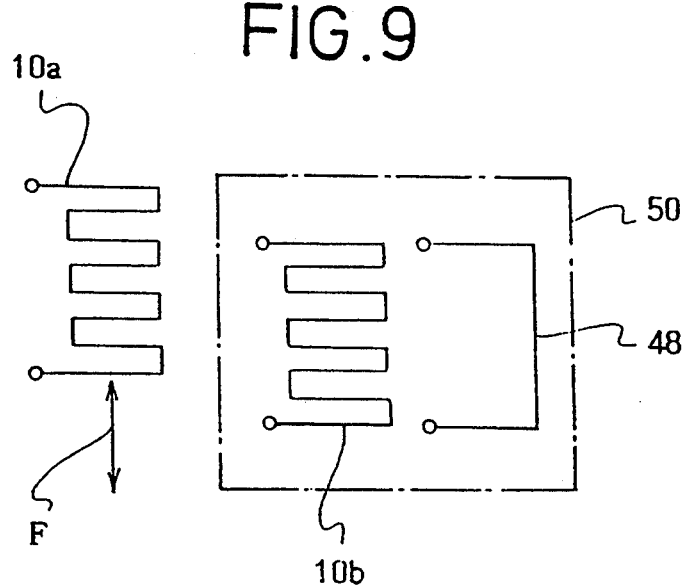
FIG. 9 is an explanation view of planar zigzag coils of a Second Embodiment.

The second Embodiment will now be explained with reference to FIG. 9. Note that, elements which are the same as elements in the First Embodiment are assigned the same symbols and explanation there will be omitted.

The first planar zigzag coil 10a is capable of moving in the first direction F (the pitch direction).

The second planar zigzag coil 10b is fixed. The planar zigzag coil 10b is influenced by the planar zigzag coil 10a when the planar zigzag coil 10a is magnetized.

A detecting coil 48 is fixed. The detecting coil 48 is also induced by the planar zigzag coil 10a when the planar zigzag coil 10a is magnetized. The detecting coil 48 detects an absolute position of the planar zigzag coil 10a. In the First Embodiment, the displacement length detected is a relative displacement length between the planar zigzag coils 10a and 10b, so it is impossible to detect moving direction of the planar zigzag coil 10b and an absolute position thereof. To detect an absolute position and a moving direction of a movable planar zigzag coil, e.g. the planar zigzag coil 10a in the Second Embodiment, the detecting coil 48 is provided.

The detecting coil 48 extends in the first direction F and faces the planar zigzag coils 10a and 10b. The number of meander is one. The length, in the first direction F, of the detecting coil 48 is equal to or greater than that of the planar zigzag coil 10b. In the present embodiment (see FIG. 9), the detecting range of the detecting coil 48 is equal to the range in which the displacement length of the planar zigzag coil 10a with respect to the planar zigzag coil 10b is detected. Note that, in case of merely detecting the moving direction of the planar zigzag coil 10a, the length of the detecting length of the detecting coil 48 may be shorter than that of the planar zigzag coil 10b.

The planar zigzag coil 10b and the detecting coil 48 are laminated on a substrate 50. The rear face is covered with a magnetizable material. By the magnetizable material, magnetic circuits, which exist on the rear side of the planar zigzag coil 10b and the detecting coil 48, are closed, and the magnetizable material shields noise from outside.

In the Second Embodiment, with the movement of the planar zigzag coil 10a in the first direction F, voltage which is similar to the solid line graph in FIG. 4 is induced in the planar zigzag coil 10b. On the other hand, voltage which is similar to the dotted line graph in FIG. 4 is induced in the detecting coil 48. Therefore, the moving direction of the planar zigzag coil 10a can be detected by detecting the change of the induced voltage of the detecting coil 48. The absolute position of the planar zigzag coil 10a can be detected on the basis of the displacement length, which is known on the basis of the induced voltage of the planar zigzag coil 10b, and said moving direction. The data processing for detecting the absolute position and the moving direction of the movable planar zigzag coil may be performed by a CPU.

(Third Embodiment)

Figure 10:
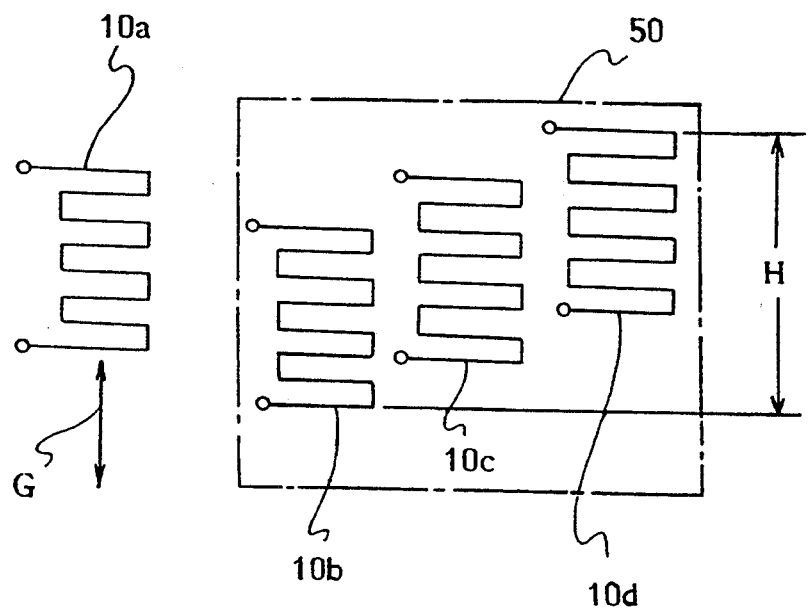
FIG. 10 is an explanation view of planar zigzag coils of a Third Embodiment.

The Third Embodiment will now be explained with reference to FIGS. 10 and 11. Note that, elements which are the same as elements in the First and Second Embodiments are assigned the same symbols and explanation thereof will be omitted.

The first planar zigzag coil 10a is capable of moving in the first direction G (the pitch direction).

Second planar zigzag coils 10b, 10c and 10d are fixed. The planar zigzag coils 10b, 10c and 10d are influenced by the planar zigzag coil 10a when the planar zigzag coil 10a is magnetized.

In the First and Second Embodiments, the displacement length of the movable planar zigzag coils is detected by counting the number of detecting a number of times the induced voltage is a certain value, e.g. 0 (mV). The sensor of the First or Second Embodiment has only one second planar zigzag coil. If the coil pitch C (see FIG. 2) is too great, the distance between the positions at which the induced voltage of the second planar zigzag coil becomes 0 (mV) must be too great, so that mid-positions between said positions are undetectable. To detect said mid-positions, the sensor of the Third Embodiment has a plurality of fixed planar zigzag coils 10b, 10c and 10d, which are fixed and mutually shifted at the prescribed intervals, e.g. ⅓ pitch, in the first direction G.

The planar zigzag coils 10b, 10c and 10d are laminated on a substrate 50. The rear face of the substrate 50 is covered with a magnetizable material. By the magnetizable material, magnetic circuits, which exist on the rear side of the planar zigzag coils 10b, 10c and 10d, are closed, and the magnetizable material shields noise from outside.

Figure 11:
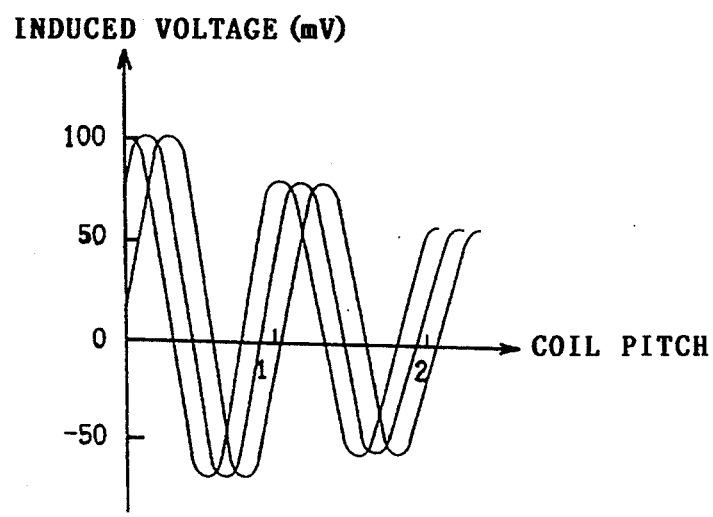
FIG. 11 is a graph of induced voltage of a second planar zigzag coil of the Third Embodiment.

In the Third Embodiment, induced voltage, which is shown in FIG. 11, is induced in the planar zigzag coils 10b, 10c and 10d when the planar zigzag coil 10a is moved in the first direction G. The number of detections of a 0 (mV) value is three times as many as that of the First and Second Embodiments, so that the sensor having a three times higher resolution than the foregoing embodiments can be realized. The displacement length of the planar zigzag coil 10a may be detected by, similar to the foregoing embodiments, counting the number of times the induced voltage is 0 (mV).

Additionally, the detecting coil 48 of the Second Embodiment may be laminated on the substrate 50. In this case, the moving direction of the planar zigzag coil 10a can be detected. Furthermore, an absolute position of the movable planar zigzag coil 10a can be detected on the basis of the displacement length thereof, which is detected on the basis of the induced voltage of the planar zigzag coils 10b, 10c and 10d, and said moving direction thereof. Note that, the length, in the first direction G, of the detecting coil is preferably equal to or greater than the total length H of the planar zigzag coils 10b, 10c and 10d. If the length of the detecting coil is equal to the total length H, the detecting range of the detecting coil is equal to the range in which the displacement length of the planar zigzag coil 10a is detected. And, in case of merely detecting the moving direction of the planar zigzag coil 10a, the length of the detecting coil may be shorter than the length H. If the number of the fixed planar zigzag coils are increased, the detecting accuracy of the sensor can be raised.

(Fourth Embodiment)

Figure 12:
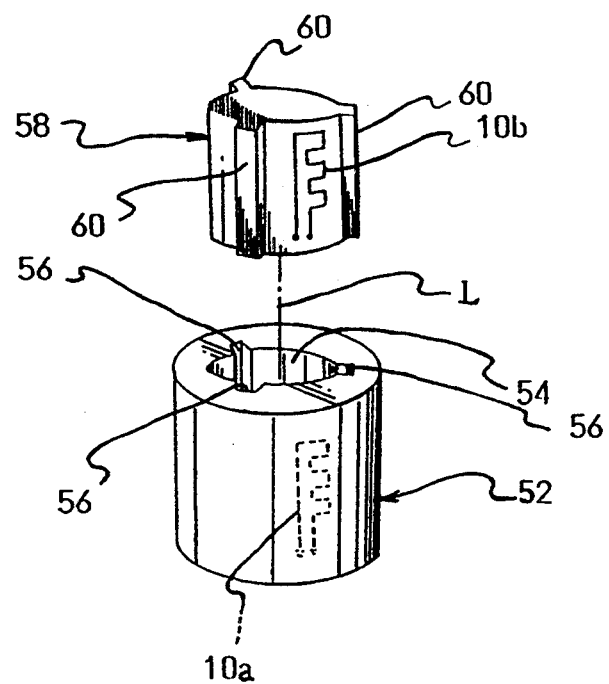
FIG. 12 is a perspective view of a sensor of a Fourth Embodiment.

The Fourth Embodiment will now be explained with reference to FIG. 12. This embodiment is an applied example of the First Embodiment, and elements which are the same as elements in the First Embodiment are assigned the same symbols and explanation thereof will be omitted.

A fixed body 52 is fixed to a member (not shown). The fixed body 52 has a through-hole 54, which is bored in the center. There are formed three engaging grooves 56, which are formed in the axial direction L of the through-hole 54, on an inner face thereof.

A displacement body 58 is slidably fitted in the through-hole 54 of the fixed body 52. There are formed three projections 60, which are formed in the axial direction L, on an outer circumferential face of the displacement body 58. The projections 60 are capable of slidably engaging with the engaging grooves 56 in the through-hole 54. With this structure, the displacement body 58 is capable of moving, within the through-hole 54, in the axial direction L, and is unable to rotate. The displacement body 58 can be moved in the direction L when outer force, e.g. pressure working on a diaphragm, is applied to the displacement body 58.

The first planar zigzag coil 10a is provided on the inner face of the through-hole 54; the second planar zigzag coil 10b is provided on the outer circumferential face of the displacement body 58. In the through-hole 54, the planar zigzag coils face each other.

When the planar zigzag coil 10b, which is induced by the planar zigzag coil 10a, moves in the first direction L, voltage which is similar to the solid line graph in FIG. 4 is induced in the planar zigzag coil 10b, so that the displacement length of the planar zigzag coil 10b or the displacement body 58 can be detected on the basis of the induced voltage. The amount of said outer force, which is applied to the displacement body, can be detected on the basis of the displacement length detected. Furthermore, the sensor of the present embodiment also may employ the detecting coil of the Second Embodiment and/or a plurality of the fixed planar zigzag coils of the Third Embodiment, so that sensors, which have higher accuracy and reliability, for a wide use can be provided.

The sensor of the present embodiment can be used for a sensor for sensing water level, which is, for example, used in an automatic electric washer. Namely, when the water level reaches a predetermined level, the water pressure becomes a predetermined value. By using the sensor, the electric washer is capable of stopping supply of water into a washtub upon reaching the predetermined water level. Furthermore, the sensor is used for pressure detecting means, e.g. a pressure sensing switch, for sensing pressure as multi-value data.

(Fifth Embodiment)

Figure 14:
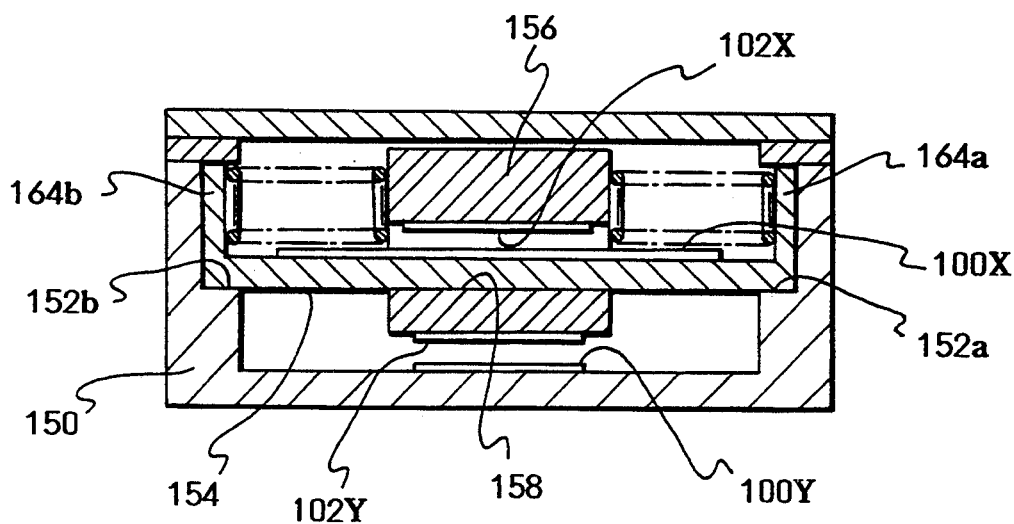
FIG. 14 is a front sectional view of the sensor of the Fifth Embodiment.
Figure 15:
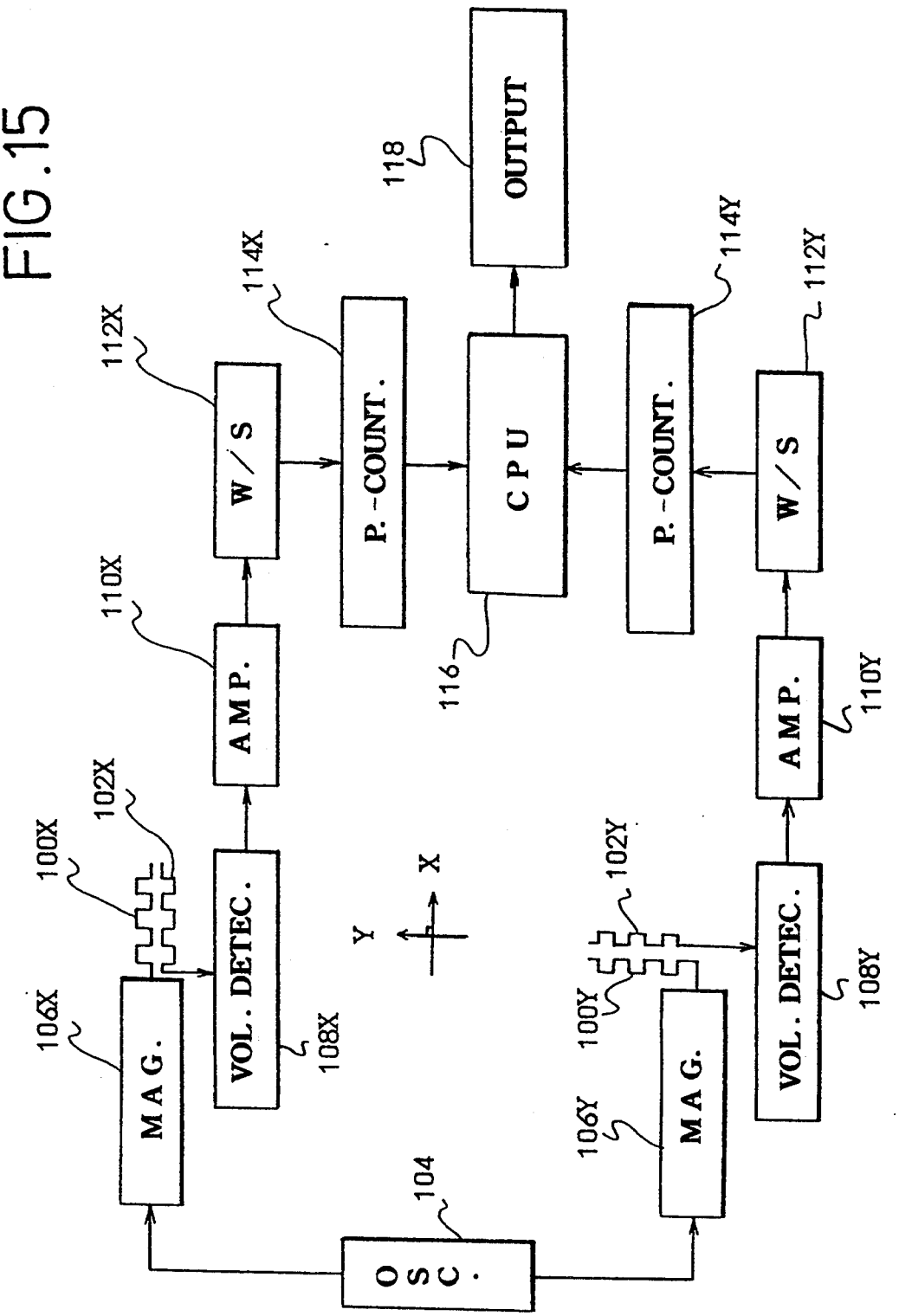
FIG. 15 is a block diagram of the Fifth Embodiment.

The Fifth Embodiment will now be explained with reference to FIGS. 13-15.

In the foregoing embodiments, the sensors are capable of sensing one dimensional displacement length. The sensor of the Fifth Embodiment is a two dimensional sensor, which is capable of sensing two dimensional displacement length.

Firstly, a mechanical structure will be explained with reference to FIGS. 13 and 15.

There are formed guides 152a and 152b, which are formed in the Y-direction, on inner faces of a casing 150.

A Y-slider 154 is provided is the X-direction. Both ends of the Y-slider 154 are slidably caught on the guides 152a and 152b, so that the Y-slider 154 is capable of moving in the Y-direction alongside the guides 152a and 152b.

An X-slider 156 has a through-hole 158, which is bored in the X-direction. The Y-slider 154 is pierced through the through-hole 158, so that the X-slider 156 is capable of moving in the X-direction alongside the Y-slider 154.

Y-springs 160a and 160b are elastically provided between the X-slider 156 and the inner faces of the casing 150 so as to always bias the X-slider 156 toward the central position in the Y-direction.

X-springs 162a and 162b are elastically provided between the X-slider 156 and extended sections 164a and 164b, which are upwardly extended from the both ends of the Y-slider 154 so as to always bias the X-slider 156 toward the central position in the X-direction.

A first planar zigzag coil 100X is provided on an upper face of the Y-slider 154 in the X-direction; a second planar zigzag coil 102X is provided on an inner upper face of the through-hole 158 of the X-slider 156 in the X-direction. The planar zigzag coils 100X and 102X are mutually faced and formed in the same pitch direction (the X-direction). With this structure, the planar zigzag coil 102X is capable of moving, with respect to the planar zigzag coil 100X, in the X-direction, with the movement of the X-slider 156 in the X-direction.

A first planar zigzag coil 100Y is provided on an inner bottom face of the casing 150 in the Y-direction; a second planar zigzag coil 102Y is provided on a bottom face of the X-slider 156 in the Y-direction. The planar zigzag coils 100Y and 102Y are mutually faced and formed in the same pitch direction (the Y-direction). With this structure, the planar zigzag coil 102Y is capable of moving, with respect to the planar zigzag coil 100Y, in the Y-direction, with the movement of the Y-slider 154 and the X-slider 156 in the Y-direction.

A control system of the above described sensor will be explained with reference to FIG. 15.

An oscillating section 104 includes a high frequency oscillating circuit. High frequency waves from the oscillating section 104 are amplified to a prescribed voltage level by magnetizing sections 106X and 106Y, each of which includes an amplifying circuit, and inputted to the planar zigzag coils 100X and 100Y. The oscillating section 104 and the magnetizing sections 106X and 106Y compose magnetizing means for magnetizing the planar zigzag coils 100X and 100Y, which are first planar zigzag coils or primary coils.

Voltage detecting sections 108X and 108Y, which are examples of first detecting means, are capable of detecting induced voltage (induced electromotive force), which is induced in the planar zigzag coils 102X and 102Y, which are second planar zigzag coils or secondary coils, by the planar zigzag coils 100X and 100Y magnetized by the magnetizing sections 106X and 106Y.

Amplifiers 110X and 110Y amplify the induced voltage, which is detected by the voltage detecting sections 108X and 108Y, to a prescribed voltage level.

Waveform shaping sections 112X and 112Y convert analogue signals, which are amplified by the amplifiers 110X and 110Y, to digital pulse signals.

Pulse-counting sections 112Y and 114Y respectively include a counter circuit. The pulse-counting sections 114X and 114Y count the number of the digital pulse signals from the waveform shaping sections 112X and 112Y. Relative displacement length, in the X- and Y-directions, of the planar zigzag coils 100X and 100Y and the planar zigzag coils 102X and 102Y can be detected on the basis of the number of the pulse signals.

Note that, the planar zigzag coils 100X and 102X, the magnetizing section 106X, the voltage detecting section 108X, the amplifier 110X, the waveform shaping section 112X and the pulse-counting section 114X compose a first sensor section; the planar zigzag coils 100Y and 102Y, the magnetizing section 106Y, the voltage detecting section 108Y, the amplifier 110Y, the waveform shaping section 112Y and the pulse-counting section 114Y compose a second sensor section.

A CPU 116, which is an example of second detecting mean, includes a microprocessor and memory units. The CPU 116 calculates the displacement length of the planar zigzag coils 102X and 102Y with respect to the planar zigzag coils 100X and 100Y, namely the displacement length in the X- and Y-directions, on the basis of the pulse number counted by the pulse-counting sections 114X and 114Y.

An output section 118, which is an example of output means, is, for example, a display unit. The output section 118 selectively shows the X-Y displacement length. Namely, two dimensional displacement length of the X-slider 156 can be outputted by the output section 118.

Note that, as with the First Embodiment, third detecting means for detecting relative moving speed between the planar zigzag coils for the X- and Y-directions and/or fourth detecting means for detecting relative acceleration between the planar zigzag coils for the X- and Y-directions may be employed. By these means for detecting, two dimensional moving speed and/or acceleration of the X-slider 156 can be detected.

Furthermore, the detecting coil of the Second Embodiment and a plurality of second planar zigzag coils, which are induced by each of the first planar zigzag coils 100X and 100Y, like the Third Embodiment, may be employed.

(Sixth Embodiment)

The Sixth Embodiment will be explained with reference to FIG. 16.

The sensor of the present embodiment is a three dimensional sensor, which is capable of sensing displacement length in the X-, Y- and Z-directions. The three dimensional sensor is an applied example of the Fifth Embodiment, and elements which are the same as elements in the Fifth Embodiment are assigned the same symbols and explanation thereof will be omitted.

Figure 13:
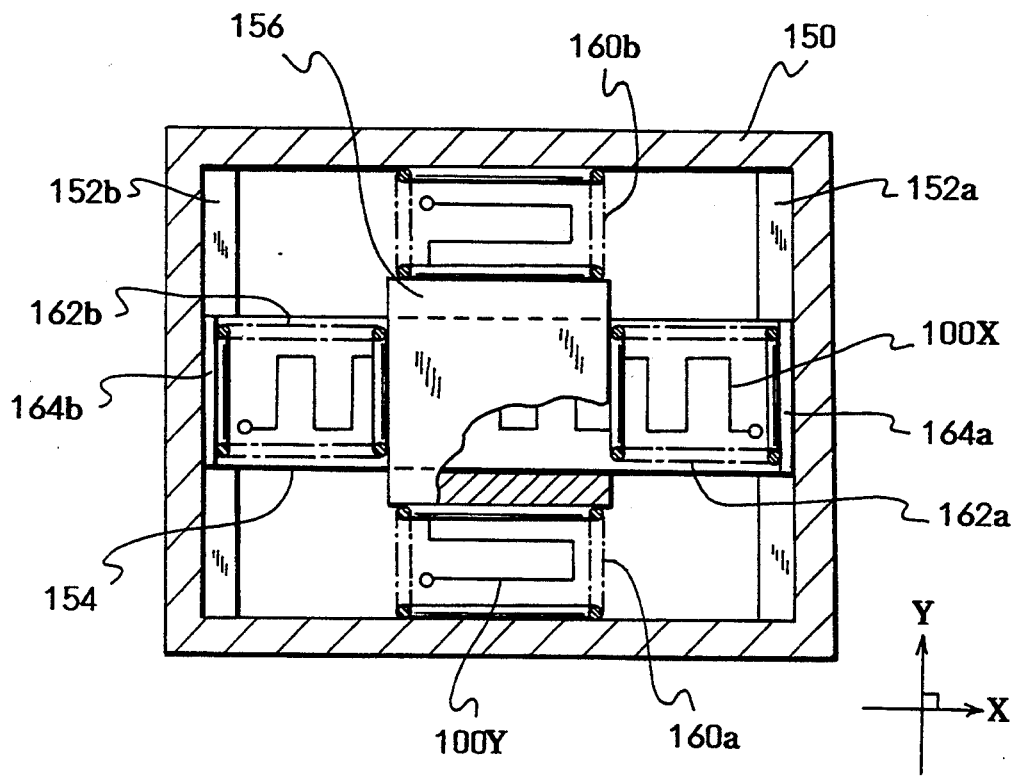
FIG. 13 is a plan sectional view of a sensor of a Fifth Embodiment.

A first sensor section 200 detects displacement length, in the X-direction, of a displacement body, e.g. the X-slider 156 shown in FIG. 13, similarly to the Fifth Embodiment.

A second sensor section 202 detects displacement length, in the Y-direction, of the displacement body, similarly to the Fifth Embodiment.

A third sensor section 204 detects displacement length, in the Z-direction, which is perpendicular to the X- and Y-directions, of the displacement body.

The CPU 116 calculates the displacement length, in the X-, Y- and Z-directions, of the displacement body on the basis of data from the first sensor section 200, the second sensor section 202 and the third sensor section 204.

The output section 118 shows the X-Y-Z displacement length. Namely, three dimensional displacement length of the displacement body can be outputted by the output section 118.

Note that, as with the First Embodiment, third detecting means for detecting relative moving speed between the planar zigzag coils for the X-, Y- and Z-directions and/or fourth detecting means for detecting relative acceleration between the planar zigzag coils for the X-, Y- and Z-directions may be employed. By these means for detecting, three dimensional moving speed and/or acceleration of the displacement body can be detected.

Furthermore, the detecting coil of the Second Embodiment and a plurality of second planar zigzag coils, which are induced by each first planar zigzag coil, like the Third Embodiment, may be employed.

In the above described six embodiments, the displacement length is detected and outputted as numerical values but the displacement length may be outputted as physical values besides numerical values, such as logical control data for controlling machines.

In the above described sensors, magnetic circuits are closed and magnetism is shielded, so that the sensor has resistance to disturbance caused by noise and environmental factors. The second detecting means detects the displacement length on the basis of number of times the predetermined value of the induced electromotive force is detected. Therefore, the sensor is capable of sensing in the range in which the first planar zigzag coil is able to induce a current in the second planar zigzag coil, so that the sensor is able to have a broader sensing range and less restriction than conventional sensors.

The invention may be embodied in other specific forms without departing the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are thereof intended to be embraced therein.

What is claimed is:

1. A sensor comprising:
   a first sensor section and a second sensor section, each of which having:
   at least one planar zigzag coil, each planar zigzag coil being provided on a substrate, said planar zigzag coils having a same coil pitch and being formed in a zigzag shape in one direction, said planar zigzag coils being capable of moving relative to one another by at least a displacement length in the one direction, said planar zigzag coils including a first planar zigzag coil for the first sensor section, which is a primary coil, and a plurality of second planar zigzag coils for the second sensor section, which are secondary coils, each of the second planar zigzag coils being a different distance from the first planar zigzag coil and each being shifted by a prescribed interval relative to an adjacent second planar zigzag coil;
   magnetizing means for magnetizing said first planar zigzag coil; and
   first detecting means for detecting induced electromotive force, which is induced in said second planar zigzag coil by said first planar zigzag coil when the first planar zigzag coil is magnetized, the first detecting means being operatively connected to at least one of the second planar zigzag coils,
   wherein the planar zigzag coils of each sensor section are mutually perpendicular; and
   second detecting means for detecting the displacement length between said first planar zigzag coil and said second planar zigzag coils of each sensor section on the basis of the induced electromotive force in said second planar zigzag coils, the second detecting means being operatively connected to the first detecting means.

2. A sensor comprising:
   a first sensor section and a second sensor section, each of which has:
   a plurality of planar zigzag coils being provided on substrates, said planar zigzag coils having a same coil pitch and being formed in a zigzag shape in one direction, said planar zigzag coils being capable of moving relative to one another by at least a displacement length in the one direction, said planar zigzag coils including a first planar zigzag coil, which is a primary coil, and a second planar zigzag coil, which is a secondary coil;
   magnetizing means for magnetizing said first planar zigzag coil; and
   first detecting means for detecting induced electromotive force, which is induced in said second planar zigzag coil by said first planar zigzag coil when the first planar zigzag coil is magnetized, the first detecting means being operatively connected to the second planar zigzag coil,
   wherein the planar zigzag coils of each sensor section are perpendicular; and
   second detecting means for detecting the displacement length between said first planar zigzag coil and said second planar zigzag coil of each sensor section on the basis of the induced electromotive force in said second planar zigzag coils, the second detecting means being operatively connected to the first detecting means, the planar zigzag coils of the first sensor section being movable in a direction which is generally perpendicular to a direction in which the planar zigzag coils of the second sensor section move.

* * * * *